(No Model.)
G. H. GRAHAM.
ROTARY ENGINE.
No. 468,198. Patented Feb. 2, 1892.
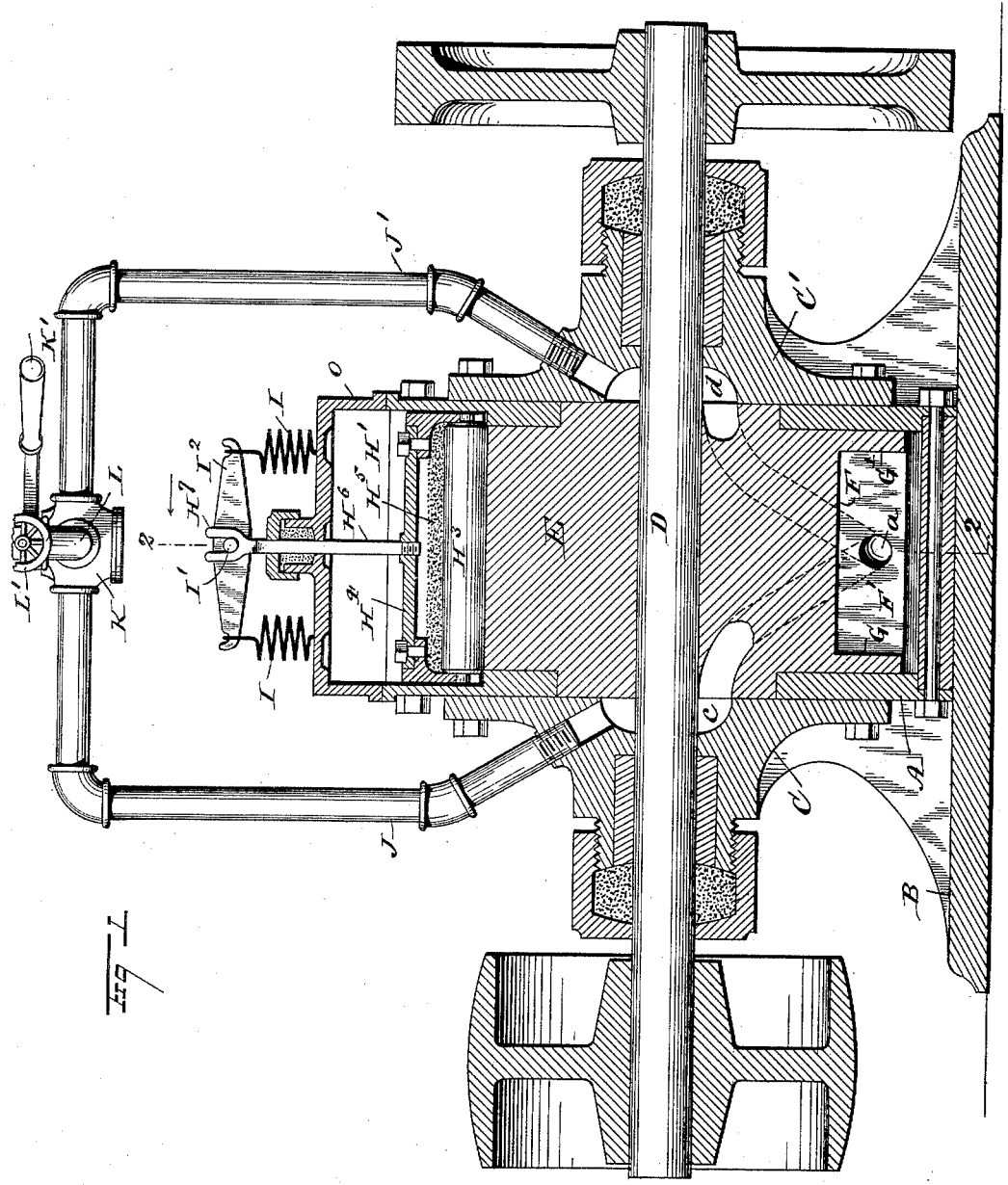
WITNESSES:
H. Walker
C. Sedgwick
INVENTOR:
G. H. Graham
BY Munn & Co.
ATTORNEYS (No Model.) 2 Sheets—Sheet 2.
G. H. GRAHAM.
ROTARY ENGINE.
No. 468,198. Patented Feb. 2, 1892.
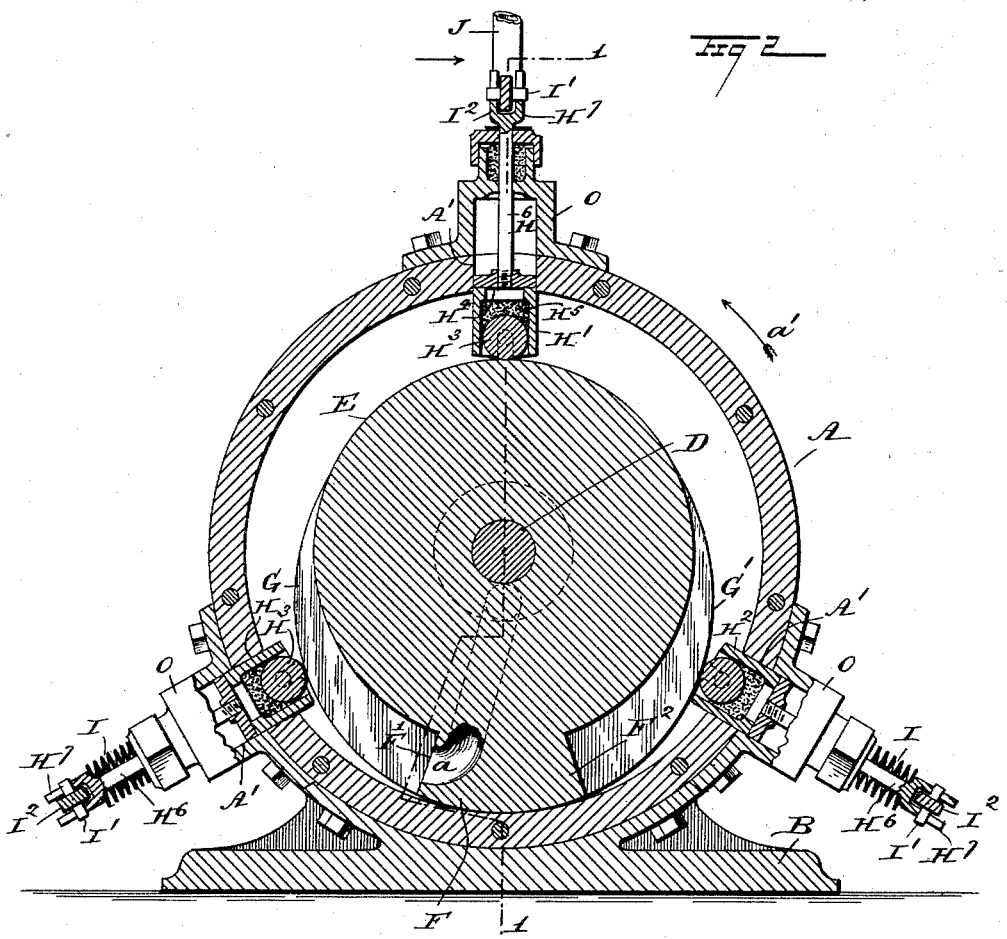
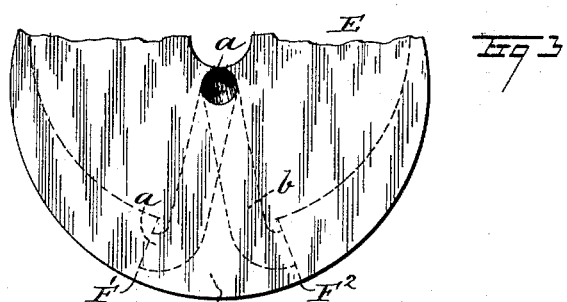
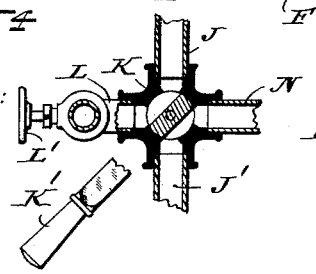
WITNESSES:
H. Walker
C. Sedgwick
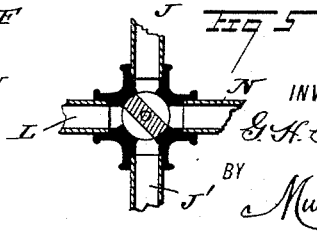
INVENTOR:
G. H. Graham
BY
Munn & Co
ATTORNEYS

UNITED STATES PATENT OFFICE.

GEORGE H. GRAHAM, OF RIDGELAND, ILLINOIS.

ROTARY ENGINE.

SPECIFICATION forming part of Letters Patent No. 468,198, dated February 2, 1892.

Application filed January 14, 1891. Renewed September 26, 1891. Serial No. 406,908. (No model.)

*To all whom it may concern:*

Be it known that I, GEORGE H. GRAHAM, of Ridgeland, in the county of Cook and State of Illinois, have invented a new and Improved Rotary Engine, of which the following is a full, clear, and exact description.

The object of the invention is to provide a new and improved rotary engine, which is simple and durable in construction and very effective in operation, utilizing the motive power to the fullest advantage.

The invention also consists in certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a transverse section of the improvement on the line 1 1 of Fig. 2. Fig. 2 is a sectional side elevation of the same on the line 2 2 of Fig. 1. Fig. 3 is a face view of part of the piston. Fig. 4 is a sectional plan view of the reversing valve, and Fig. 5 is a like view of the same in a different position.

The improved rotary engine is provided with a cylinder A, secured on a suitable base and provided with the heads C C', in which is journaled in suitable bearings and packing-boxes the main shaft D. On the latter is secured within the cylinder A a piston E, somewhat less in diameter than the inside diameter of the cylinder A, so as to form a steam-space with the latter.

On the piston E is secured or formed a radially-extending head F, fitting closely to the inner surface of the cylinder A. (See Fig. 2.) From the two faces F' and $F^2$ of the head F extend the curved flanges G and G', respectively, arranged near the ends of the head close to the inner sides of the cylinder A. The flanges G and G' vanish on the periphery of the piston E at points the distance of which is equal to one-third of the entire circumference of the piston E. On the peripheral surface of the piston E, located between the two vanishing points of the flanges G and G' and also on the flanges, as well as the peripheral surface of the head F, are adapted to travel the valves H, H', and $H^2$, arranged radially and fitted to slide in suitable bearings A', formed in the rim of the cylinder A. The several valves H, H', and $H^2$ are pressed inward in contact with the several surfaces mentioned by means of the exterior springs I. From the faces F' and $F^2$ of the head F extend in the piston E the ports $a$ and $b$, respectively leading to opposite sides of the piston, to register at all times with the annular cavities $c$ and $d$, respectively formed on the inner surface of the heads C and C', respectively. Into the cavities $c$ and $d$ lead the pipes J and J', respectively, both opening into a four-way valve K, actuated by lever K, and provided with a steam-inlet pipe L' connected with a suitable source of steam-supply. A valve L' in the said pipe L serves to regulate the admission of live steam to the valve K. The latter is also provided with an exhaust-pipe N, arranged opposite the inlet-pipe L, which with the latter stands at right angles to the pipes J and J'. (See Figs. 4 and 5.) When the valve K is in a position as shown in Fig. 4, steam from the inlet-pipe L can pass through the valve K to the pipe J, while exhaust-steam coming up through the pipe J' can pass through the valve K to the exhaust-pipe N. When the operator shifts the valve K to the position shown in Fig. 5, then the steam-inlet pipe L connects with the pipe J', and the pipe J, which then carries the exhaust-steam, opens into the exhaust-pipe N. The valves H, H', and $H^2$ are preferably of the construction shown, each being provided with a roller $H^3$, adapted to travel on the previously-mentioned surfaces of the piston E, the flanges G, G', and the head F, so that the friction between the respective valves and the parts in contact with them is reduced to a minimum. Each roller $H^3$ is journaled in a casing $H^4$, fitted to slide in the bearing A', previously mentioned, and also in a casing O, secured to the outside of the cylinder A. The space between the top of the casing $H^4$ and the roller $H^3$ is preferably filled with a lubricating material, so as to properly lubricate the roller $H^3$. The top of the casing $H^4$ is rigidly connected with a valve-stem $H^6$, extending through a suitable stuffing-box in the top of the casing O, the outer end of the valve-stem $H^6$ being provided with a fork $H^7$, in which are journaled the trunnions I' of a lever $I^2$, connected with springs I, which exert a pressure against the said lever I², so as to hold a respective valve H, H′, or H² inward in contact with the surfaces previously mentioned.

The operation is as follows: When the valve K is in position, as illustrated in Fig. 4, live steam, passing through the pipe L, the valve K, and pipe J, enters the cavity c in the cylinder-head C, and from the said cavity passes through the port a to one side of the piston-head F to press partly against the valve H, but mainly against the valve H′, thus rotating the piston E in the direction of the arrow a′. By this movement of the piston E the valve H² is caused to slide outward, as its friction-roller H³ now travels up the flanges G′ to finally pass onto the peripheral surface of the head F, at which time the valve H has moved to its innermost position, its frictional roller H³ then standing at the vanishing point of the flanges G. Steam is then confined between the head F and the valve H, and on the further rotation of the piston E the head F passes the valve H², so that the latter commences to slide inward, live steam issuing through the port a and then pressing against the valve H² and the valve H. A further impulse is thus given to the piston E. The valve H′ at this time commences to slide outward, traveling up the flanges G′, so that the steam confined between the two valves H and H′ can pass through the port b into the cavity d, and from the latter through the pipe J′ to the exhaust-pipe N, past the valve K. The above-described operation is successively repeated with the several valves, so that a continuous rotary motion is imparted by the piston E to the main driving-shaft D and the machinery connected therewith. When the operator desires to reverse the engine, he moves the lever K′, so as to change the position of the valve K, in the manner previously described, and illustrated in Fig. 5. Live steam, entering the pipe L, passes past the valve K into the pipe J′, and from the latter through the cavity d and port b into the cylinder A at the face F² of the head F. If the piston E and the several valves are then in the position shown in Fig. 2, the live steam presses against the valve H² and against the totally-closed valve H′, so as to cause the piston E to revolve in the inverse direction of the arrow a′. The exhaust then takes place through the port a, cavity c, and pipe J, which, by the valve K, is connected with the exhaust-pipe N.

It will be seen from the foregoing that the engine is very simple in construction and can be readily reversed at any time by merely changing the position of the valve K.

Having thus described my invention, I claim as new and desire to secure by Letters Patent—

1. In a rotary engine, a valve consisting in a rectangular casing having an open inner side and a roller journaled in the ends of said casing and projecting through its open side, a lubricant-receiving space being formed in rear of the roller, and a valve-stem, substantially as set forth.

2. In a rotary engine, a spring-pressed valve comprising a casing, a friction-roller journaled in the said casing, a valve-stem extending from the said casing, a lever pivoted on the said valve-stem, springs pressing against the said lever, and a lubricating material placed in the said casing in the rear of the said roller to lubricate the latter, substantially as shown and described.

GEORGE H. GRAHAM.

Witnesses:
MARSHALL WAIT,
THOMAS GANNANE.